(12) United States Patent
Scott

(10) Patent No.: US 9,856,731 B2
(45) Date of Patent: Jan. 2, 2018

(54) APPARATUS AND METHOD FOR WELLHEAD TESTING

(71) Applicant: Phase Dynamics, Inc., Richardson, TX (US)

(72) Inventor: Bentley N. Scott, Garland, TX (US)

(73) Assignee: Phase Dynamics, Inc., Dallas, TX (US)

( * ) Notice: Subject to any disclaimer, the term of this patent is extended or adjusted under 35 U.S.C. 154(b) by 397 days.

(21) Appl. No.: 14/179,139

(22) Filed: Feb. 12, 2014

(65) Prior Publication Data

US 2014/0224006 A1    Aug. 14, 2014

Related U.S. Application Data

(60) Provisional application No. 61/764,381, filed on Feb. 13, 2013, provisional application No. 61/823,166, filed on May 14, 2013.

(51) Int. Cl.
| | |
|---|---|
| *E21B 49/00* | (2006.01) |
| *G01F 1/84* | (2006.01) |
| *G01F 1/74* | (2006.01) |
| *E21B 47/10* | (2012.01) |
| *G01F 1/20* | (2006.01) |

(52) U.S. Cl.
CPC .............. *E21B 49/00* (2013.01); *E21B 47/10* (2013.01); *G01F 1/20* (2013.01); *G01F 1/74* (2013.01); *G01F 1/8436* (2013.01); *G01F 1/8477* (2013.01)

(58) Field of Classification Search
CPC . G01F 1/74; G01F 1/84; G01F 1/8436; G01F 1/8477

USPC ....... 73/1.16, 152.18, 152.29, 152.31, 19.04, 73/195–198, 53.04, 61.64, 861.04, 73/861.354, 861.355–861.356
See application file for complete search history.

(56) References Cited

U.S. PATENT DOCUMENTS

| | | | | |
|---|---|---|---|---|
| 5,157,339 | A * | 10/1992 | Scott ...................... | G01N 22/00 |
| | | | | 324/639 |
| 7,380,439 | B2 * | 6/2008 | Gysling .................... | G01F 1/74 |
| | | | | 73/32 A |
| 7,660,689 | B2 * | 2/2010 | Mattar ...................... | G01F 1/32 |
| | | | | 702/100 |
| 2005/0188771 | A1 * | 9/2005 | Lund Bo .................. | G01F 1/40 |
| | | | | 73/861 |
| 2006/0096388 | A1 * | 5/2006 | Gysling .................. | G01F 1/666 |
| | | | | 73/861.03 |
| 2006/0247869 | A1 * | 11/2006 | Lucero ..................... | G01F 1/74 |
| | | | | 702/50 |

(Continued)

*Primary Examiner* — Peter Macchiarolo
*Assistant Examiner* — Anthony W Megna Fuentes

(57) ABSTRACT

A wellhead test system comprising: i) a Coriolis mass flow meter configured to receive a flow of a liquid; ii) a water analyzer configured to receive the flow of the liquid; and iii) a controller coupled to the Coriolis mass flow meter and the water analyzer. The controller receives from the Coriolis mass flow meter at least one of: mass flow measurement data, mass density measurement data, and drive gain and also receives from the water analyzer at least one of water frequency measurement data, oil frequency measurement data, and insertion loss measurement data. The controller determines a gas volume fraction (GVF) value and modifies the operation of the Coriolis mass flow meter and the water analyzer based on the GVF value.

16 Claims, 13 Drawing Sheets

(56) References Cited

U.S. PATENT DOCUMENTS

| | | | | |
|---|---|---|---|---|
| 2006/0266127 A1* | 11/2006 | Gysling | ............... | G01F 1/66 73/861.23 |
| 2010/0198531 A1* | 8/2010 | Bell | ............... | G01F 1/74 702/45 |
| 2012/0118077 A1* | 5/2012 | Henry | ............... | G01F 1/74 73/861.354 |

* cited by examiner

| Frequency (MHz) | Dielectric @ 25C | Absorption @ 25C |
|---|---|---|
| 0.1 | 78.2 | 4000 |
| 1 | 78.2 | 400 |
| 10 | 78.2 | 46 |
| 100 | 78 | 50 |
| 300 | 77.5 | 160 |
| 3000 | 76.7 | 1570 |
| 10000 | 55 | 5400 |
| 25000 | 34 | 2650 |

FIGURE 6

| Coriolis Meter | Microwave Water Analyzer | Process Variables With Separator | Process Variables Without Separator |
|---|---|---|---|
| Vibration Freq. (approx. 100 Hz) | Oil Oscillator Freq. (approx. 100 to 500 MHz) | Build and Dump Water | Change Submersible Pump Speed if applicable |
| Drive Gain (%) | Oil Incident Power (V) | Change Choke Opening – Upstream Pressure (psi) | Change Choke Opening – Upstream Pressure (psi) |
| Tube Amplitude (mm) | Oil Reflected Power (V) | Change Downstream Pressure Drop for Balance | Change Downstream Pressure Drop for Balance |
| Coriolis Affect deviation of tubes | Water Oscillator Freq. (approx. 200 MHz) | Level | |
| | Water Incident Power (V) | | |
| | Water Reflected Power (V) | | |
| | Complete Calibration Data Set of Frequencies versus Water % and Salinity | | |

FIGURE 9

| Coriolis Meter | Microwave Water Analyzer |
|---|---|
| Vibration Freq. (approx. 100 Hz)<br>Calculate Uncorrected Density | Oil Oscillator Freq. (approx. 100 to 500 MHz)<br>Calculate 0% to Approx. 70% Water % in Oil Emulsion Phase<br>Also Determine Emulsion Phase (Oil or Water) |
| Drive Gain (%)<br>Assist Gas Calculation Gas Volume Fraction (GVF) | Oil Incident Power (V)<br>Calculate Energy Sent To Liquids At Oil Frequency |
| Tube Amplitude (mm)<br>Assist in GVF Calculation | Oil Reflected Power (V)<br>Calculate Energy Lost in Liquids & Emulsion Phase |
| Coriolis Affect<br>Calculate Mass Flow | Water Oscillator Freq. (approx. 200 MHz)<br>Calculate W/C% Water Continuous Phase<br>Also Calculate e Emulsion Phase (Oil or Water) |
| Transmittance Drive Coil to Sensing Coils – Assist in GVF Calculation | Water Incident Power (V)<br>Calculate Energy Sent To Liquids At Water Frequency |
| | Water Reflected Power (V)<br>Calculate Energy Lost in Liquids & Emulsion Phase |
| | Complete Calibration Data Set of Frequencies versus Water % and Salinity<br>Calculate Gas Volume Fraction |

FIGURE 10

APPARATUS AND METHOD FOR WELLHEAD TESTING

CROSS-REFERENCE TO RELATED APPLICATION(S) AND CLAIM OF PRIORITY

The present application is related to U.S. Provisional Patent No. 61/764,381, filed Feb. 13, 2013, entitled "Individual Well Test System" and to U.S. Provisional Patent No. 61/823,166, filed May 14, 2013, entitled "Well Head Test Systems and Methods". U.S. Provisional Patent Nos. 61/764,381 and 61/823,166 are assigned to the assignee of the present application and are hereby incorporated by reference into the present application as if fully set forth herein. The present application hereby claims priority under 35 U.S.C. §119(e) to U.S. Provisional Patent Nos. 61/764,381 and 61/823,166.

TECHNICAL FIELD

The present application generally relates to well testing, and more particularly to improving on-line water content analyzer measurements of petroleum produced by a well at the wellhead without separation.

BACKGROUND

Wellhead test systems are widely used in the oil and gas industry. A wellhead test system determines the amount of gas, oil, and water produced by a given well that penetrates a subterranean reservoir in which such natural resources reside. Data from the wellhead test system (or "well test system" or "test system") may be used to determine whether any properties of the reservoir or the resources therein have changed over time. The test data also may be used to allocate well production in situations where multiple wells feed a unitary production separator that separates all of the natural resources recovered from the region where the wells are located. The wellhead test data also may be useful where one production area handles wells from different taxation regions and production must be allocated to the particular field from which it originated. Various multiphase systems are available which measure oil, water and gas content of a production well without separation. These systems are expensive and can contain dangerous radioactive sources.

Well tests are usually expected to be reproducible with limits more or less defined by the company or government entity requiring them. Many applications may allow reduced accuracy of measurement due to low quality oil, cost of measurement and government relaxing of rules to allow more oil production in unfavorable markets. Several companies have addressed these at the well head measurements with unconventional solutions which still require acceptance of large errors and inability to confirm compliance to uncertainties required.

The use of real-time analyzers, such as density analyzers, capacitance analyzers, radio frequency (RF) analyzers, and microwave analyzers, to measure the water content of petroleum products is common. A single well is typically tested for 4 hours to 24 hours per well and only the gross totals of oil, water, and gas are maintained for the test. The same well may not be re-tested for changes until the remaining wells have been cycled through the well test separator system.

In conventional well test systems that measure the amounts of gas, oil, and water produced by a well, a gas separator first separates the gas from the three-phase mixture coming from the well. The well test system then measures gas and liquid flow rates. Next, the well test system measures the water content (%). The water content may be determined, for example, by measuring density or by using a permittivity method (e.g., RF or microwave). Many separators do not remove all of the gas and, therefore, 10% or greater gas volume fraction (GVF) may be seen at the flow meters and water analyzers. Conventional systems cannot separate the data to determine gas volume percent or water percentage because of the entrained free gas.

Real-time data provides several beneficial operational advantages. Measurement of gas, oil, and water as they are being produced at the wellhead eliminates many valves, large vessels, and radioactive sources while producing real-time well data (instead of one test per week or month for that well). In a situation such as steam assisted gravity drain (SAGD) production, the performance of a well may change considerably in a short period of time. In order to maximize production and maintain cost effectiveness, real-time well performance data is very important to well operators.

Current Method Issues

Wellhead test systems that measure density (e.g., a Coriolis flow meter) are adversely affected by entrained gas. The gas acts like a shock absorber and forces the Coriolis meter to increase the drive gain to compensate for the loss in ability to vibrate the tubes of the Coriolis meter. Although a measurement of mass can usually be made even at higher GVF, the volume and density are affected by the entrained gas. This gives poor density measurement. Some equipment makers use the drive gain to assist in the correction for entrained gas. However, one problem with this approach is that the drive gain and density are highly correlated and therefore another variable is required to achieve good correction.

Water analyzers are affected by gas in both water and oil emulsion phases. In both emulsion phases, the affect appears as if more oil is being produced than is actually produced. This is more pronounced in the water phase due to the gas looking like oil. A one percent (1%) gas volume fraction (GVF) appears to give 1% error in apparent water percentage. In the oil phase, the oil and gas both appear to have low polar moments, with the water still being seen by the system.

Therefore, there is a need to measure the production of oil, water, and gas at a well—without separation—in order to have real-time information that may be used to determine what the well is producing. There is a need to reduce the amount and cost of equipment that provides the real-time information. There is a further need for a wellhead test system that allows full-time well data instead of flowing the output of one well at a time through a multiphase system.

SUMMARY

To address the above-discussed deficiencies of the prior art, it is a primary object to provide, for use in a new system in which the existing elements of measurement are used together to increase the number of independent variables available to solve the measurements of gas, oil and water production at the wellhead. This system would include a Coriolis meter and a water analyzer with the corresponding data.

Accordingly, there is provided a wellhead test system comprising: i) a Coriolis mass flow meter configured to receive a flow of a liquid; ii) a water analyzer configured to receive the flow of the liquid; and iii) a controller coupled to the Coriolis mass flow meter and the water analyzer. The controller is configured to receive from the Coriolis mass flow meter at least one of: i) mass flow measurement data, ii) mass density measurement data, and iii) drive gain, and is further configured to receive from the water analyzer at least one of: i) water frequency measurement data, ii) oil frequency measurement data, and iii) insertion loss measurement data. The controller is further configured to determine a gas volume fraction (GVF) value and to modify the operation of the Coriolis mass flow meter and the water analyzer based on the GVF value.

In one embodiment of the disclosure, the controller determines the GVF value based on measurement data from the water analyzer.

In another embodiment of the disclosure, the controller determines the GVF value based on a combination of the measurement data from water analyzer and measurement data from the Coriolis mass flow meter.

In still another embodiment of the disclosure, the controller determines the GVF value based on the at least one of: i) water frequency measurement data, ii) oil frequency measurement data, and iii) insertion loss measurement data.

In yet embodiment of the disclosure, the controller determines the GVF value based on a combination of the least one of: i) water frequency measurement data, ii) oil frequency measurement data, and iii) insertion loss measurement data and measurement data from the Coriolis mass flow meter.

In a further embodiment of the disclosure, the controller determines is configured to iteratively update or compensate the measurement data from the Coriolis meter and water analyzer in subsequent measurements.

There is also provided a method of testing liquids at a wellhead comprising: 1) receiving a flow of the liquid in a Coriolis mass flow meter; 2) receive the flow of the liquid in a water analyzer; 3) measuring in the Coriolis mass flow meter at least one of: i) mass flow measurement data, ii) mass density measurement data, and ii) drive gain measurement data; 4) measuring in the water analyzer at least one of: i) water frequency measurement data, ii) oil frequency measurement data, and iii) insertion loss measurement data; 5) determining a gas volume fraction (GVF) value; and 6) modifying the operation of the Coriolis mass flow meter and the water analyzer based on the GVF value.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 is a table illustrating the imaginary (or loss) portion and the real (dielectric) portion of permittivity in the water continuous emulsion phase without salt.

FIG. 9 is a table listing exemplary Coriolis meter 110 and microwave water analyzer 120 variables and potential process changes/variables.

FIG. 10 is a table listing independent variables that may be calculated using the variables in FIG. 9.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wellhead test system.

The present disclosure describes a single well, multiphase system—without gas separation—that uses a Coriolis meter and a water analyzer. Both devices are corrected for gas volume fraction (GVF) through the use of independent variables provided by each meter/analyzer and then determining (or solving for) the GVF. For example, using the drive gain from the Coriolis meter and the frequency variable from the water analyzer provides two independent measurements, where one is a vibration drive voltage and the second is proportional to the permittivity (an electrical parameter).

According to the principles of the present disclosure, the wellhead test system comprises a controller that determines a GVF value based on measurement data from both the water analyzer and the Coriolis meter. The combination of measurement data from both devices enables the wellhead test system to determine a more accurate GVF value than conventional systems that rely only on measurement data from the Coriolis meter. Using the more accurate GVF value, the controller is configured to iteratively update or compensate the measurement data from the Coriolis meter and water analyzer in subsequent measurements. The iterative process is repeated until convergence occurs in the GVF value.

Figure 1:
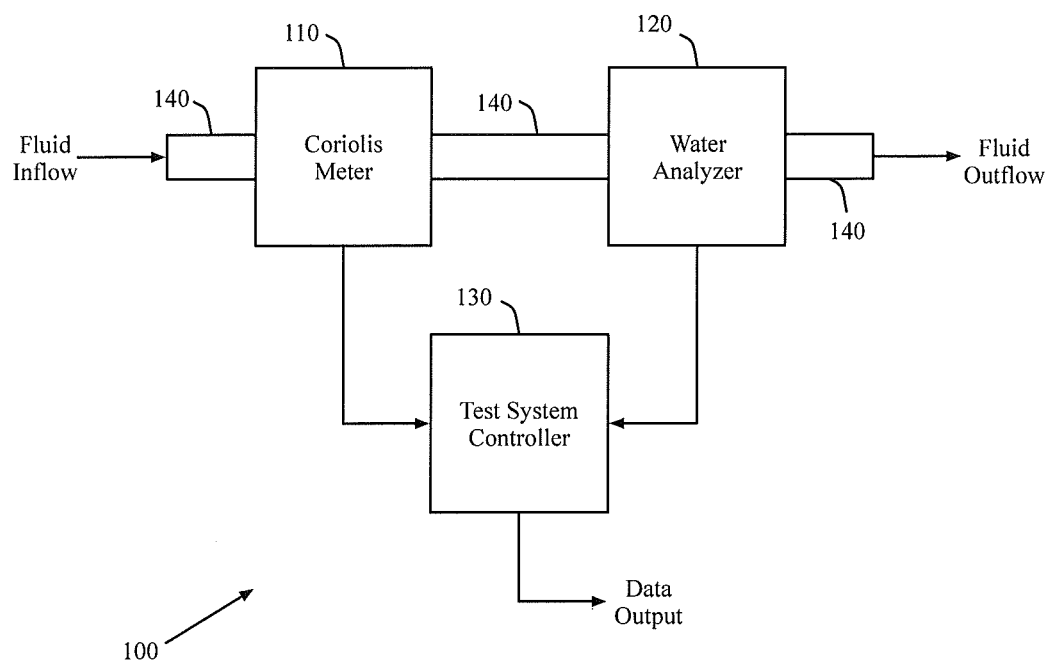
FIG. 1 illustrates a wellhead test system according to one embodiment of the present disclosure.

FIG. 1 illustrates wellhead test system 100 according to one embodiment of the present disclosure. Wellhead test system 100 comprises Coriolis meter 110, water analyzer 120, and test system controller 130. According to the principles of the present disclosure, wellhead test system measures the properties of the fluid (i.e., oil, gas, and water) in pipe 140 and uses the combined measurements from Coriolis meter 110 and water analyzer 120 to calculate the gas volume fraction (GVF) to correct the flow, density, and water percentage, thereby improving the accuracy of the measurement. Advantageously, using a Coriolis flow meter and a water analyzer without additional equipment reduces cost and provides improvements over conventional systems. This also allows full-time well data to be measured instead of flowing one well at a time through a multiphase system for measurement.

Test system controller 130 any be any one of a number of different types of conventional controllers. In an exemplary embodiment of the disclosure, test system controller 130 may comprise a processor and associated random access memory (DRAM and/or SRAM). The processor and memory execute a control application that may be stored in an external disk storage device or in a Flash memory. In some embodiments, test system controller 130 may be implemented as a stand-alone module with input/output (I/O) connections to Coriolis meter 110 and water analyzer 120. In alternate embodiments, test system controller 130 may be implemented on an internal circuit board associated with either Coriolis meter 110 or water analyzer 120.

Figure 2A:
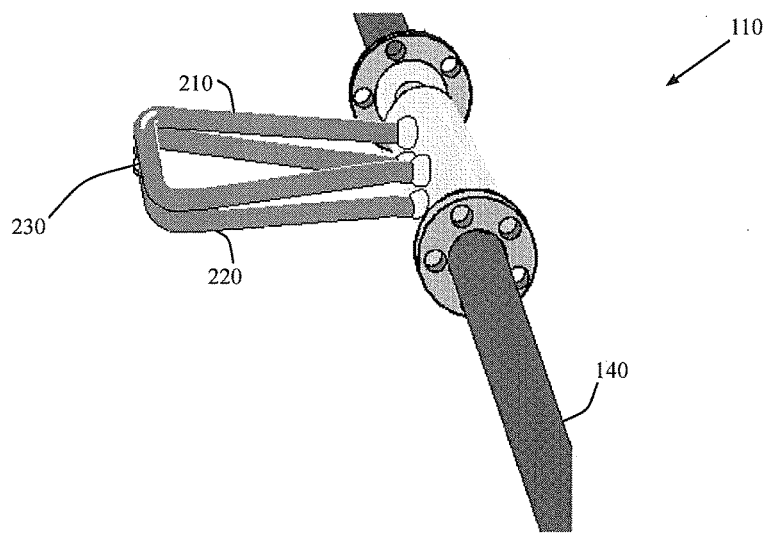
FIGS. 2A and 2B illustrate a Coriolis meter according to an exemplary embodiment of the present disclosure.
Figure 2B:
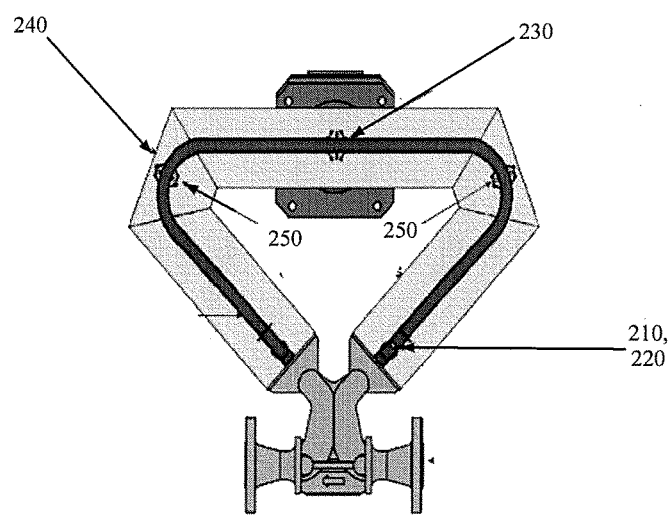

FIGS. 2A and 2B illustrate Coriolis meter 100 according to an exemplary embodiment of the present disclosure. Coriolis meter 100 comprises two U-shaped tubes 210 and 220 disposed in containment case 240. The fluid flow is diverted to pass through the pair of tubes 210 and 220. Tubes 210 and 220 are thin enough to allow a small magnetic-coupled drive coil 230 to vibrate coils 210 and 220 at low frequencies. As the mass flow increases, the right and left tube bends move in proportion to the flow rate. The incoming portions of the U-shaped tubes move outward while the opposite sides move inward. This is the Coriolis effect.

The deflections of the two sides are measured by pick-off sensor coils 250, so that the mass flow rate may be determined. The density can be determined by the natural frequency generated (approximately 100 Hz) by vibrating tubes 210 and 220. The drive gain is related to the amount of energy required to drive tubes 210 and 220 into oscillation and is limited by the stiffness of tubes 210 and 220, the electromagnetic coil 230, and the power available for driving tubes 210 and 220. As gas is introduced into the liquids, the gas acts like a shock absorber. Thus, more energy is required to drive tubes 210 and 220 than without the presence of entrained gas bubbles. The measure of how far tubes 210 and 220 travel is compromised by the stiffness of tubes 210 and 220 and the maximum available drive gain. Thus, the measurement of density is compromised very quickly by the presence of gas bubbles. Thus, all of the variables present represent mechanical parameters of stiffness (density) or natural frequency, Coriolis affect for mass flow, and drive gain, which is the electrical power to drive tubes 210 and 220. Test system 100 is used to define mass flow and density of the liquids flowing through tubes 210 and 220. The addition of gas has only drive gain to supplement the information to resolve the third variable.

The drive gain is highly correlated with the gas content and the density of the mixture. The higher the noise content of the drive gain is, the larger the gas content is. This is well known in the art and has been used by itself to attempt to correct for entrained gas. Various methods similar to that described for a microwave system in U.S. Pat. No. 5,157,339 (Scott) may be used with the drive gain to correct for entrained gas. The subject matter of U.S. Pat. No. 5,157,339 is hereby incorporated by reference into the present application as if fully set forth herein. As the gas increases, this becomes less capable of resolution to determine the GVF, since it is a mechanical vibration system with slower response than the electronic methods used in water analyzer 120.

One embodiment of water analyzer 120 that is described in U.S. Pat. No. 5,157,339 measures the change in permittivity and insertion loss of a microwave signal traversing a pipe full of the gas/water/oil fluid being measured. A method to correct the water percentage using statistical information from the frequency and insertion loss exists, but the method becomes limited as the GVF increases beyond 10%.

According to the principles of the present disclosure, an algorithm that continually compares thresholds and maintains statistics for each of the variables from both systems (Coriolis meter 110 and water analyzer 120) may extend and improve the uncertainty of the oil/gas/water measurement. These two independent measurement systems and their output variables are used together by test system controller 130 to provide additional control information than either device standing alone could provide.

Coriolis Flow Meter Measurement and Principals

Coriolis meters, such as Coriolis meter 110, have been used for measurement of liquid density, flow rate and water percentage for many years in the oil field. U.S. Pat. No. 7,188,534 (Tombs et al.) describes at column 26, lines 53-63, using a water percent analyzer in conjunction with a Coriolis meter, as shown in FIG. 22 of U.S. Pat. No. 7,188,534. The subject matter of U.S. Pat. No. 7,188,534 is hereby incorporated by reference into the present application as if fully set forth herein. However, U.S. Pat. No. 7,188,534 and similar conventional systems do not describe what parameters of the water analyzer may be used to assist in any correlation or correction beyond the correction for density and water cut. This ability to correct also appears to be limited in the oil continuous emulsion phase (shown only to 50% water). In the oil continuous emulsion phase, the measurement of water percentage by microwave energy is not affected by entrained gas to the same extent that the entrained gas affects the measurement of the water continuous emulsion phase.

The reason for this is the permittivity of oil and gases are close to each other (approximately 2.5 and 1.01) and both are insulating. So, the imaginary part of permittivity (i.e., loss) is not involved. Above the point where the emulsions change to the water continuous emulsion phase, the water analyzer error is affected by GVF for a one-to-one percentage. That is, a 1% gas volume fraction gives an error in apparent water percentage of 1%. In the water continuous emulsion phase, the water is conductive and, therefore, the imaginary part of permittivity influences the measurement greatly. This typically occurs above 75% water content.

This present disclosure describes additional variables and information obtained from water analyzer 120 that may be used to assist in the correction of gas where Coriolis meter 110 and microwave water analyzer 120 are used together.

Figure 4:
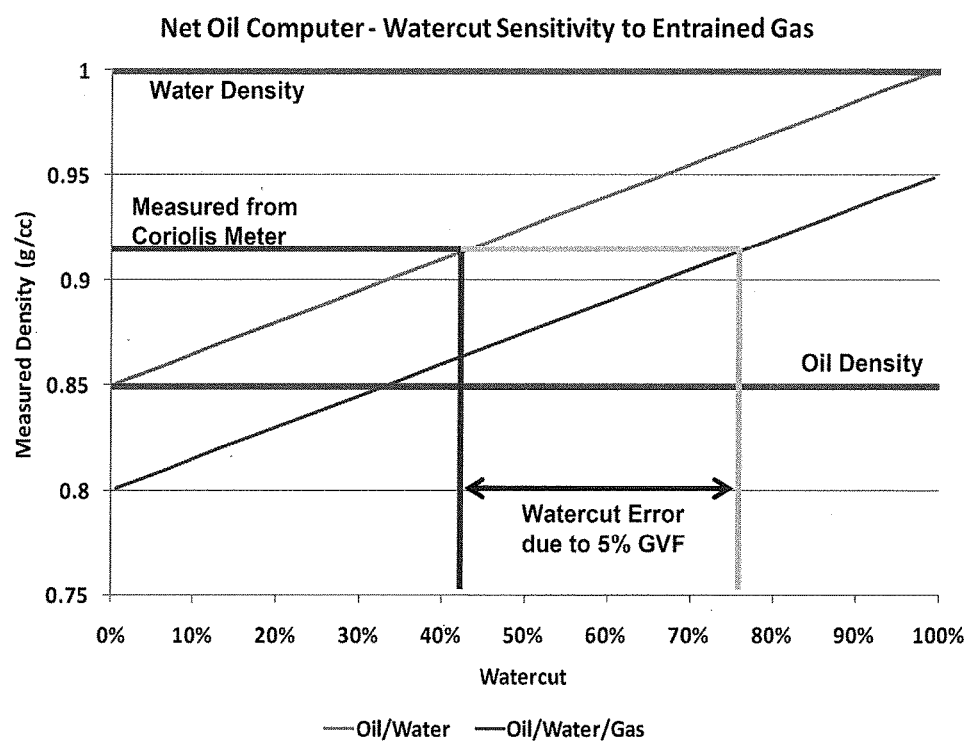
FIG. 4 is a graph of gas effects for a Coriolis meter that demonstrates the effect that small amounts of entrained gas has on the performance of a Coriolis meter used for water measurement.

FIG. 4 illustrates a graph of gas affects for a Coriolis meter that demonstrates the effect that small amounts of entrained gas has on the performance of a Coriolis meter used for water measurement. A 5% gas volume fraction (GVF) may give an error in water cut of about 34% in the calculation using measured density. Coriolis meters, such as Coriolis meter 110, use the known densities, $\rho_{water}$, and $\rho_{oil}$, of the flowing liquids at process conditions to obtain percentage of water. The volume fraction of each, multiplied by the pure liquid densities, equals one. Therefore, $$\rho_{water} \times \phi_{water} + \rho_{oil} \times \phi_{oil} = 1. \quad [\text{Eqn. 1}]$$

If the known density of water is 1.0 gm/cc and oil is 0.85 gm/cc (as in the graph in FIG. 4), then the water percentage is:

$$100 \times (\rho_{meas} - \rho_{oil}) / (\rho_{water} - \rho_{oil}). \quad [\text{Eqn. 2}]$$

When there is gas present, there are three variables (oil, water and gas) and the three volume fractions are equal to one ($\phi_{water} + \phi_{oil} + \phi_{gas} = 1$). The densities of all three are multiplied by the volume fraction of each to equal the measured density.

Unfortunately, the relationship to water percentage is now lost due to the unknown third variable percentage. U.S. Pat. No. 7,188,534 outlines various methods to overcome the lack of a directly applicable extra variable to solve for the gas fraction. One method is the measurement of the energy it takes to drive the vibration, which is proportional to the viscosity, density, and gas volume fraction. Again, there are more unknowns than directly measured independent variables. Also, once the drive gain (or power to drive tubes 210 and 220) into vibration is increased to the maximum, Coriolis meter 110 cannot continue to measure. The gas acts like a shock absorber, which dampens the vibrations. Thus, the capabilities of Coriolis meter 110 may be limited to approximately 5% GVF.

Microwave Analyzer Measurement of Water % and Gas Effects Below 70%

Permittivity is made up of the energy storage portion (real part of permittivity) and the imaginary portion, which is the loss factor (rotational inertia, conductive loss, and interfacial loss) and is normally given as:

$$\text{Permittivity } (\epsilon) = \text{energy storage } (\epsilon') + j \text{loss}(\epsilon''). \quad [\text{Eqn. 3}]$$

Figure 5:
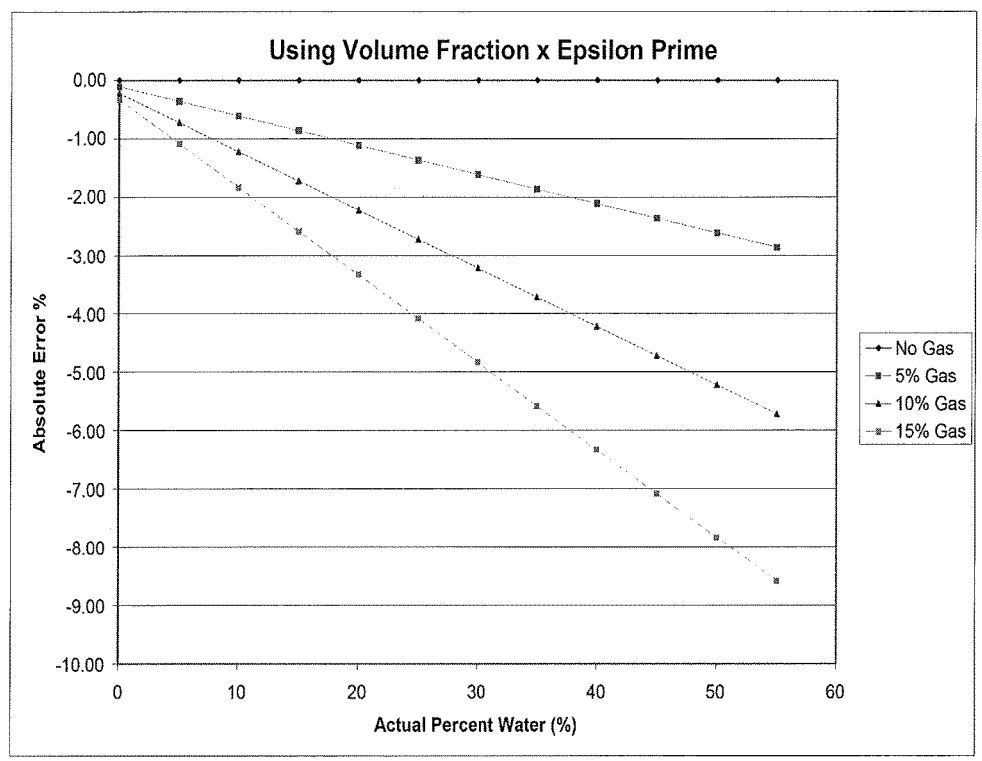
FIG. 5 is a graph of the error in permittivity for different percentages of gas volume fraction and different water percentages.

The real or energy storage portion of permittivity is typically referred to as the "dielectric constant". The permittivity of oil is approximately 2.5, gas is 1.01. and water is 68-80, depending upon temperature. As with density, for the permittivity of a mixture of oil and water below 70% water (oil continuous phase), the water percentage calculation is the fraction of oil and water multiplied by the respective volume fractions. Therefore:

$$\epsilon_{mix} = \epsilon_{oil} \times \phi_{oil} + \epsilon_{water} \times \phi_{water}, \quad [\text{Eqn. 4}]$$

which gives errors in this emulsion phase much smaller than those given by the equation using the square root of the dielectric constant. There are other permittivity mixing equations known in the art, but for the purposes of this disclosure, Equation 4 will be used as the results are very similar. This above discussion holds for low water percentages where there is no loss factor (the imaginary portion of permittivity is negligible). This typically holds below 70% water. The error would be calculated as shown in FIG. 5 and is relatively small compared to any density with gas calculation.

Microwave Analyzer Measurement of Water % and Gas Effects Above 70%

Figure 7A:
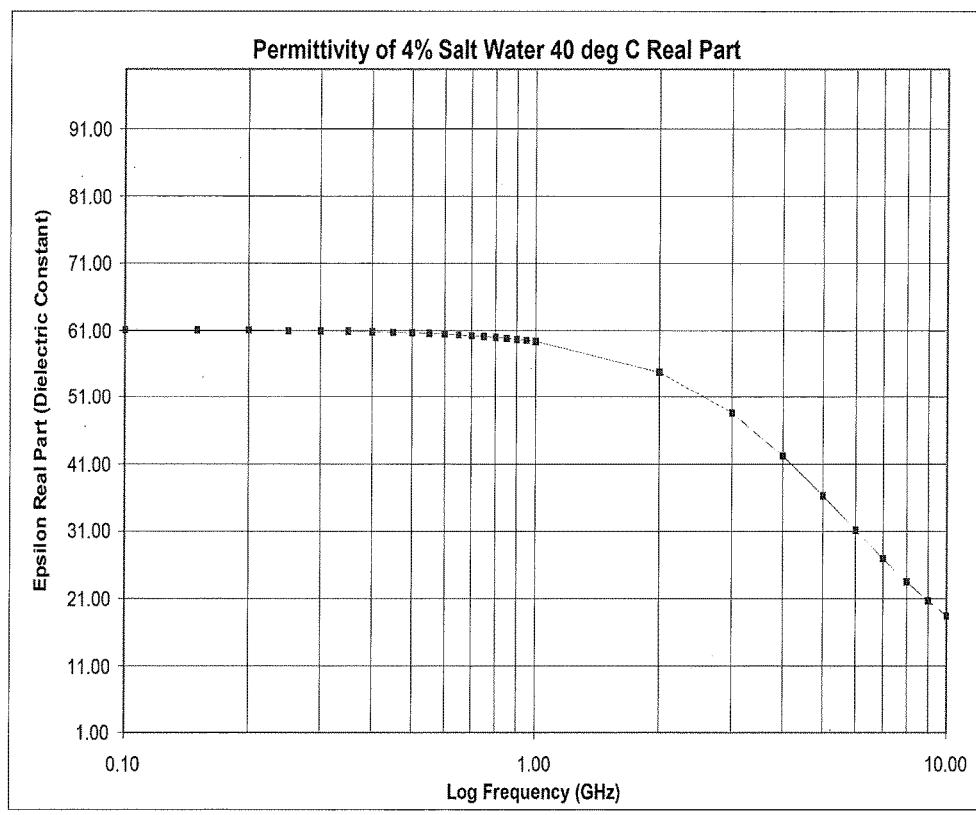
FIGS. 7A and 7B are graphs illustrating the imaginary (or loss) portion and the real (dielectric portion of permittivity in the water continuous emulsion phase for different percentages of salt.
Figure 7B:
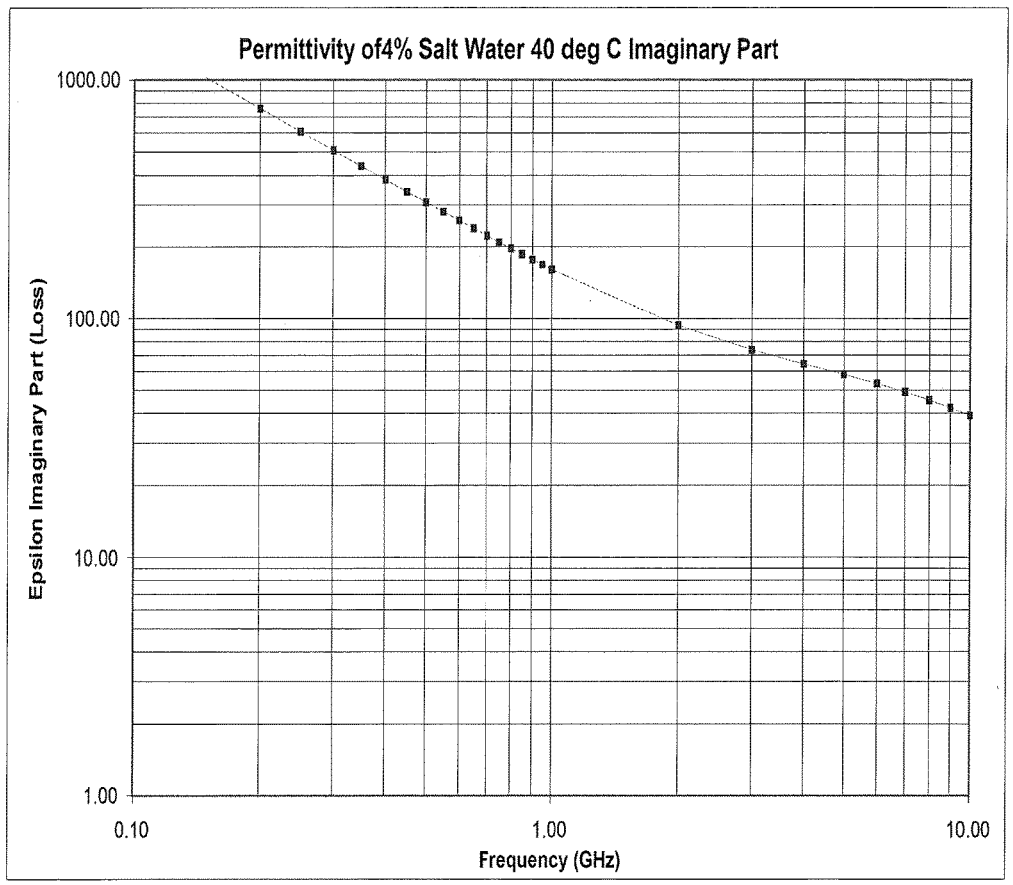

When the emulsion reverts to the water continuous (water surrounding the oil) emulsion phase the liquid medium is now conductive and depends upon the ionic compounds (salts) in solution with the water. In the water continuous emulsion phase the imaginary or loss portion of permittivity is dominant over the real part as can be seen in the table in FIG. 6. This table is for pure water without salt. When salt is added the change in the real (dielectric) and imaginary (absorption) parts can be seen in FIGS. 7A and 7B. The imaginary (absorption) part dominates the overall propagation vector especially below 1 GHz where it increases almost exponentially, as shown in FIG. 7B.

Figure 3:
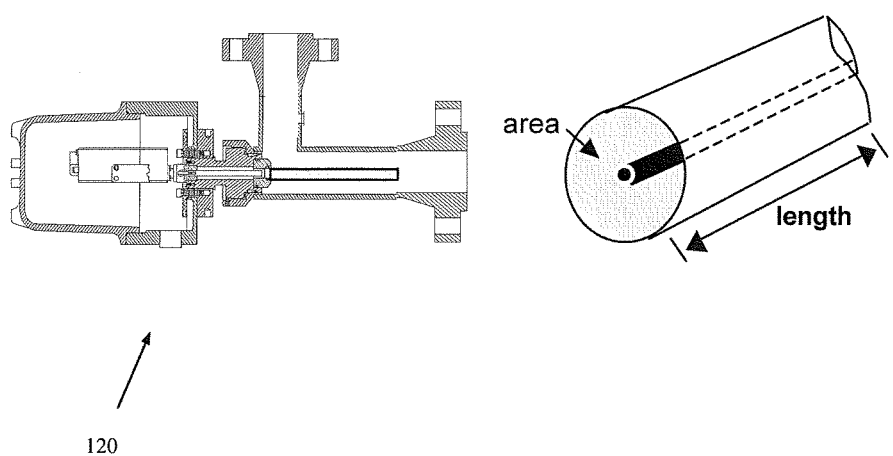
FIG. 3 illustrates an exemplary microwave water analyzer 120 according to one embodiment of the present disclosure.

FIG. 3 illustrates an exemplary microwave water analyzer 120 according to one embodiment of the present disclosure. If the measurement section is configured to propagate a "skin depth" mode, as described in U.S. Pat. No. 4,996,490 (Scott) and U.S. Pat. No. 5,025,222 (Scott), then the electrical portion of the wave is in the ceramic and the magnetic or current mode is in the liquids. The subject matter of U.S. Pat. Nos. 4,996,490 and 5,025,222 are hereby incorporated into the present application as if fully set forth herein. In that case, the liquids effectively become a resistor with an area equal to the inside of the pipe and the length of the antenna. The result means the true effective water measurement is made from a baseline of the imaginary part of permittivity, where 100% salt water establishes where there is all water. When oil droplets are in the emulsion, the oil is non-conductive and therefore changes the effective imaginary part. If a coaxial line section forms the microwave measurement area, the cross sectional area and length, along with the salt in the water, define the value of the imaginary part of permittivity, as shown in FIG. 3.

Thus, the calculation is for a cylinder with resistance through the area of conductivity of salt water. As oil or gas is introduced, the conductivity of the area decreases proportionally. Therefore, in this mode of water continuous emulsion phase and a frequency below approximately 500 MHz and dimensions of 2" to 6" pipe with a cross sectional aluminum oxide antenna cover of approximately 0.5 inch, the imaginary part of the permittivity dominates the measurement and is proportional to the oil or gas in the cross sectional area. Unlike Coriolis meter 110, the measurement does not stop because of tube drive being saturated.

Skin Depth Mode of Propagation or Propagation Through a Resistive Liquid

In a conductor, there is a force caused by the magnetic portion of an alternating current through the conductor, which causes the current density to be largest near the surface of the conductor. This is driven by the alternating current causing an alternating magnetic field. The intensity of the field changes and therefore creates an electrical field, which opposes the change in current density, thereby moving the conducting electrons toward the outer portion of the conductor. The skin depth effect causes the current density to decrease exponentially from the value at the surface. Approximately 98% of the current is in the first four skin depths. In its simplest form, this can be calculated as follows:

$$\delta = \sqrt{((2 \ast \rho)/((2 \ast \pi) \ast (\mu_0, \mu_r)))}, \text{ or}$$

$$\delta = \sqrt{2\rho/(\omega, \mu)}, \text{ or approximately}$$

$$\delta = 503\sqrt{\rho/(\mu_r \ast f)}, \text{ where:}$$

$\delta$ = skin depth in meters,
$\rho$ = resistivity of the medium in ohm-meter,
$\mu_r$ = relative permittivity of the medium,
$\mu_o$ = permittivity of free space,
$\omega$ = radian frequency, and
$f$ = frequency in hertz (Hz).

For a 0.5% salt solution, the resistivity (from Schlumberger Salt resistivity chart) is equal to 1.75 ohm-meter and for 250 MHz, the skin depth is equal to 0.042 meters. Four skin depths equals 0.168 meters. This is significant in a water analyzer 120 using a coaxial system in that the liquids become the outer conductor with the 0.5 inch diameter ceramic and the 0.125 inch metal antenna allowing for electrical propagation when the liquids are in the water continuous emulsion phase. In essence, the entire liquid cross section and antenna length are measured.

Factory Calibration for Water Continuous Phase

Figure 8:
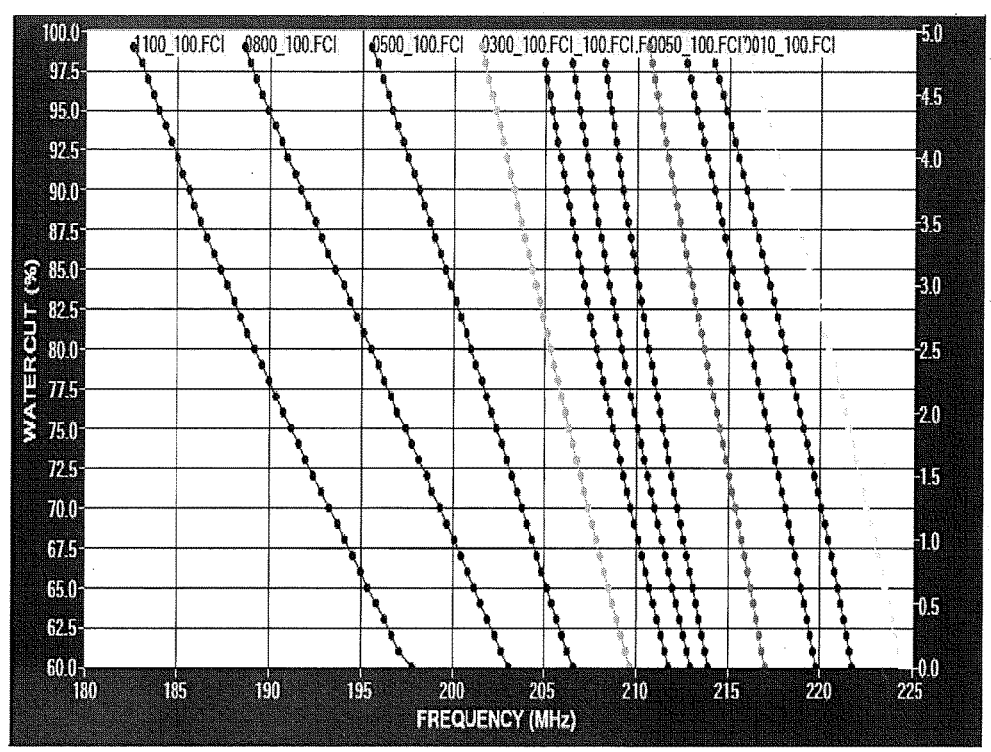
FIG. 8 is a graph illustrating curves of frequency versus water percentage for different salinities.

A factory calibration uses a flow loop where 100% salt water of various salinities are used to begin a calibration where each salt water is loaded and then oil is injected to create complete curves of frequency versus water percentage for each salinity. FIG. 8 is a graph illustrating a plurality of curves of frequency versus water percentage for different salinities. Since each salt water curve with water percentage at 100% establishes a minimum frequency that is the lowest frequency seen during the testing of any individual well, a routine may be implemented in which test system controller 130 may learn the salinity versus time values. Such a routine is disclosed in U.S. Pat. No. 7,587,290 (Scott). The subject matter of U.S. Pat. No. 7,587,290 is hereby incorporated by reference into the present application as if fully set forth herein.

Wellhead test system 100 is capable of calculating the GVF based upon the calibration curves shown in FIG. 8. The curves are generated using a flow loop. Each curve is generated by adding 100% salt water of various weight percentages into the loop and then injecting pure water down to a water cut of 60%. The results are the "water emulsion curves" of FIG. 8. Alternatively, wellhead test system 100 and test system controller 130 may replace the water emulsion curves with a mathematical model. In this manner, test system controller 130 is configured to correlate water percentages at various salinities with corresponding resistivity values. These correlations enable the measurements or estimations of the GVF values.

When gas is present, the cross sectional resistance of the salt water in the coaxial transmission line, with the liquids occupying the space between the ceramic, the antenna, and the inner portion of the pipe, may change. Since the gas is non-conductive, when the gas volume fraction is below approximately 10%, the small bubbles occupying this area should be relatively uniform and consistent. U.S. Pat. No. 8,368,412 (Scott) describes methods for handing this gas and dynamically adjusting salt to maintain a measurement. The subject matter of U.S. Pat. No. 8,368,412 is hereby incorporated by reference into the present application as if fully set forth herein. This present disclosure describes how wellhead test system 100 may provide the apparent salinity with gas as part of the following calculation of gas volume fraction.

Use of Microwave Analyzer for Gas Volume Fraction Determination

This present disclosure takes advantage of the fact that, due to the nature of the measurement, if the beginning well salinity is known, the gas volume fraction may be calculated from the change in resistivity. The "no gas" salinity may be determined by direct entry or by having a process change where water analyzer 120 only saw pure water with no gas and the salinity may be calculated from the factory calibration curves. This could also be accomplished at the end of a well test before the current well was switched out. A two-phase separator may separate the water such that a good free water sample could be sent to water analyzer 120 by opening the downstream control valve. The resulting lowest frequency would represent "gas-free" water and therefore the actual salinity of the water could be calculated from the factory calibration curves. The real-time gas volume fraction may be calculated by taking the gas-free salinity (resistivity) and calculating the amount of the volume fraction that gives the resulting real time salinity (resistivity) in the process.

For example, for water analyzer 120 in FIG. 3, consider the following values:

Center ceramic diameter=0.5"=0.127 meters, area equals 0.00202683 meters$^2$

Inner diameter of pipe=2.0"=0.508 meters, area equals 0.000126677 meters$^2$

2" pipe area minus area of 0.5" ceramic=0.001900153 meter

Liquid length=8 inches=0.2032 meters

Resistivity of 0.5% salt at 100° F.=0.85 ohm-meter

No-gas effective resistivity=0.2032 m×0.001900153 m$^2$×0.85 ohm-m=90.898 ohm m$^2$ If with gas, the 0.4% salinity curve is calculated from the minimum frequency, then:

Resistivity for 0.4% salt at 100° F.=1.00 ohm-meter

Gas effective resistivity=0.2032 m×0.001900153 m$^2$×1.0 ohm-m=106.939 ohm-m$^2$ The gas volume fraction that it takes to reduce the effective area to obtain the original effective resistivity without gas is calculated to be 17% volume percent gas.

Effective correction for entrained gas within the liquid flow may be implemented to determine gas volume percent independent of any other instrument and without iterative mathematical processes. Coupled with previously disclosed gas correction methods, the present disclosure provides for a powerful base to correlate with other measurements to improve and validate measurements.

Use of Microwave Analyzer Calculated Gas Volume Fraction and a Coriolis Meter to Improve Measurement without Separation Well testing systems may include a Coriolis meter for taking the flow and density measurements and a permittivity based on-line analyzer as described earlier for taking water content measurements of produced petroleum. Using this combination improve the measurement because of the addition of other independent variables to the solution. A well that produces a high level of water typically cycles between a large span of water percentages because the drill string extending through the well to the ground becomes a vertical separator. As a result, the water builds up in the well and is then pushed through as a water slug. Methods for improving the water content measurements thus may take advantage of this cycling of high water percentages.

In addition, many wells produce lower amounts of gas as the original gas cap has been depleted over time. Other types of production processes, such as water floods and jet pumps, are used to increase reservoir pressure and typically have lower gas volume fractions. In these situations, it would be advantageous and cost effective to not have a large separator to remove the gas, but to use instead the multiple variables provided by microwave water analyzer 120 and Coriolis flow meter 110 to resolve the gas fraction, water percentage, and oil production.

The combination of Coriolis meter 110 (and its variables) coupled with microwave water analyzer 110 (and its variables) provides superior correction for gas entrainment in liquids. This should be effective up to approximately 5% gas volume fraction, where Coriolis meter 110 may stall and cease to vibrate because of the gas. Microwave water analyzer 120 will continue to work and calculate until the gas volumes become non-homogeneous and therefore the microwave propagation becomes scattered rendering improper results. This point would be reached when large pockets of free gas are present or when large volume fractions of three phases exist.

FIG. 9 is a table listing exemplary Coriolis meter 110 and microwave water analyzer 120 variables and potential process changes/variables.

FIG. 10 is a table listing independent variables that may be calculated using the variables in FIG. 9.

Data can be processed separately with the results read by test system controller 130 or may be processed by either Coriolis meter 110 or water analyzer 120 after receiving both the manufacturer's public data and any proprietary calculation results, such as GVF. In addition, as outlined in U.S. Pat. No. 7,599,803 (Scott et al.), the data may be collected across a well test environment and then post processed to improve the results. The subject matter of U.S. Pat. No. 7,599,803 is hereby incorporated by reference into the present application as if fully set forth herein.

Figure 11:
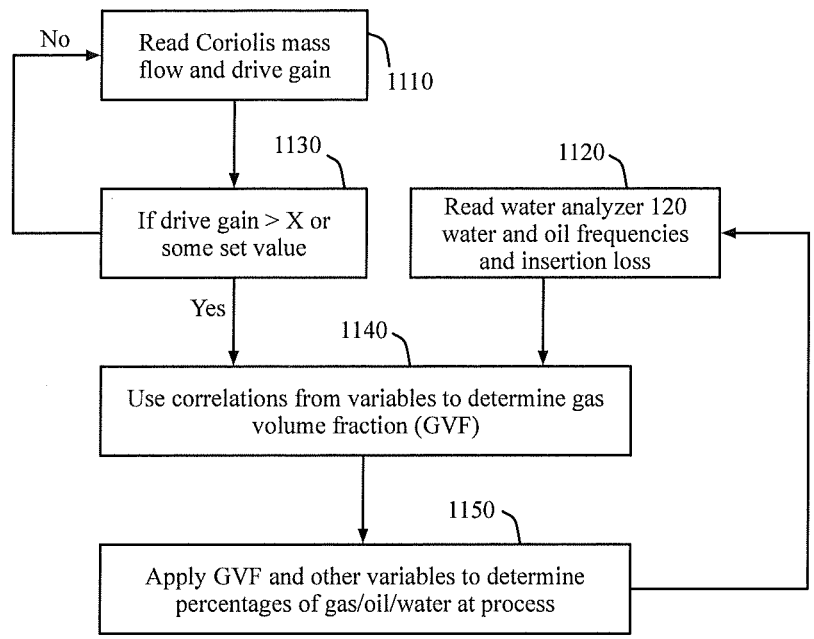
FIG. 11 is a flow diagram illustrating a real-time operation of a test system controller according to one embodiment of the present disclosure.

FIG. 11 is a flow diagram illustrating a real-time operation of test system controller 130 according to one embodiment of the present disclosure. Initially, test system controller 130 reads from Coriolis meter 110 measurement data such as Coriolis mass flow and drive gain (step 1110). Test system controller 130 also reads from water analyzer 120 measurement data such as water frequencies, oil frequencies, and insertion loss (step 1120). Next, test system control 130 determines if the drive gain value is greater than some threshold X or some set value (step 1130).

If No, then test system controller 130 continues to read measurement data from Coriolis meter 110. If Yes, then test system controller 130 uses correlations from variables to determine gas volume fraction (GVF) value (step 1140). Finally, test system control 130 applies the GVF and other variables to determine more accurate percentages of gas, oil, and water in the process (step 1150). Coriolis meter 110 and water analyzer 120 can then use the more accurate percentages of gas, oil, and water to take more accurate measurements of Coriolis mass flow, drive gain, water frequencies, oil frequencies, and insertion loss.

Figure 12:
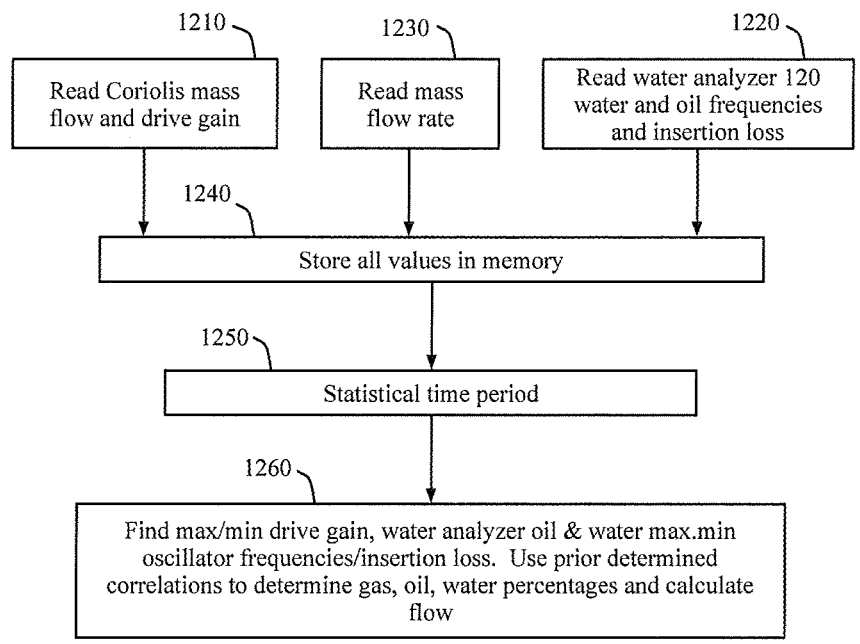
FIG. 12 is a flow diagram illustrating a non-real time operation of a test system controller according to one embodiment of the present disclosure.

FIG. 12 is a flow diagram illustrating a non-real time operation of test system controller 130 according to one embodiment of the present disclosure. Initially, test system controller 130 reads from Coriolis meter 110 measurement data such as Coriolis mass flow and drive gain (step 1210). Test system controller 130 also reads from water analyzer 120 measurement data such as water frequencies, oil frequencies, and insertion loss (step 1220). Test system controller 130 may also read mass flow rate from another device (step 1230).

Test system control 130 stores all of the measured values in a memory (step 1240). This process is then repeated for some statistical time period (step 1250). Finally, test system controller 130 determines (or finds) maximum and minimum values of drive gain, water analyzer oil and water maximum and minimum values for oscillator frequencies, and maximum and minimum values for insertion losses. Test system controller 130 may use prior determined correlations to determine gas, oil, water percentages and calculate flow (step 1250).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A wellhead test system comprising:
a Coriolis mass flow meter configured receive a flow of a liquid;
a water analyzer configured to receive the flow of the liquid; and
a controller coupled to the Coriolis mass flow meter and the water analyzer,
wherein the controller is configured to receive from the Coriolis mass flow meter at least one of: i) mass flow measurement data, ii) mass density measurement data, and iii) drive gain measurement data, and is further configured to receive from the water analyzer at least one of: i) water frequency measurement data associated with an oscillator of the water analyzer, ii) oil frequency measurement data associated with an oscillator of the water analyzer, and iii) insertion loss measurement data,
wherein the controller is further configured to determine a gas volume fraction (GVF) value and to modify the operation of at least one of the Coriolis mass flow meter or the water analyzer based on the GVF value; and
wherein the controller determines the GVF value based on a combination of the measurement data from water analyzer and measurement data from the Coriolis mass flow meter.

2. The wellhead test system as set forth in claim 1, wherein the controller determines the GVF value based on the at least one of: i) water frequency measurement data, ii) oil frequency measurement data, and iii) insertion loss measurement data.

3. The wellhead test system as set forth in claim 2, wherein the controller determines the GVF value based on a combination of the least one of: i) water frequency measurement data, ii) oil frequency measurement data, and iii) insertion loss measurement data and measurement data from the Coriolis mass flow meter.

4. The wellhead test system as set forth in claim 1, wherein the controller determines the percentages of gas, oil and water in the flow of the liquid.

5. The wellhead test system as set forth in claim 1, wherein the controller determines the GVF value based on correlations in the measurement data from the water analyzer.

6. The wellhead test system as set forth in claim 5, wherein the controller determines the GVF value based on correlations in the measurement data from the Coriolis mass flow meter.

7. The wellhead test system as set forth in claim 5, wherein the controller is configured to determine the GVF value by calculating a change in resistivity measured by the water analyzer compared to an initial water salinity value measured with substantially no gas present in the water.

8. The wellhead test system as set forth in claim 1, wherein the controller determines the GVF value by correlating a water percentage at a select salinity level with a corresponding resistivity value.

9. A method of testing liquids at a wellhead comprising:
receiving a flow of the liquid in a Coriolis mass flow meter;
receive the flow of the liquid in a water analyzer;
measuring in the Coriolis mass flow meter at least one of: i) mass flow measurement data, ii) mass density measurement data, and iii) drive gain measurement data;

measuring in the water analyzer at least one of: i) water frequency measurement data associated with an oscillator of the water analyzer, ii) oil frequency measurement data associated with an oscillator of the water analyzer, and iii) insertion loss measurement data;

determining a gas volume fraction (GVF) value based on a combination of the measurement data from water analyzer and measurement data from the Coriolis mass flow meter; and modifying the operations of the Coriolis mass flow meter and the water analyzer based on the GVF value.

10. The method as set forth in claim 9, wherein determining the GVF value determines the GVF value based on the at least one of: i) water frequency measurement data, ii) oil frequency measurement data, and iii) insertion loss measurement data.

11. The method as set forth in claim 10, wherein determining the GVF value determines the GVF value based on a combination of the least one of: i) water frequency measurement data, ii) oil frequency measurement data, and iii) insertion loss measurement data and measurement data from the Coriolis mass flow meter.

12. The method as set forth in claim 9, wherein determining the GVF value determines the percentages of gas, oil and water in the flow of the liquid.

13. The method as set forth in claim 9, wherein determining the GVF value determines the GVF value based on correlations in the measurement data from the water analyzer.

14. The method as set forth in claim 13, wherein determining the GVF value determines the GVF value based on correlations in the measurement data from the Coriolis mass flow meter.

15. The method as set forth in claim 13, wherein determining the GVF value determines the GVF value by calculating a change in resistivity measured by the water analyzer compared to an initial water salinity value measured with substantially no gas present in the water.

16. The method as set forth in claim 9, determining the GVF value determines the GVF value by correlating a water percentage at a select salinity level with a corresponding resistivity value.

* * * * *